Jan. 22, 1946.  A. Z. MAMPLE ET AL  2,393,329
FACSIMILE RECORDER
Filed Dec. 24, 1940  9 Sheets-Sheet 1

FIG. 1  FIG. 2

INVENTORS
A. Z. MAMPLE
L. A. REED
BY
M. J. Reynolds
ATTORNEY

Jan. 22, 1946.  A. Z. MAMPLE ET AL  2,393,329
FACSIMILE RECORDER
Filed Dec. 24, 1940  9 Sheets-Sheet 2

INVENTORS
A. Z. MAMPLE
L. A. REED
BY
M. J. Reynolds
ATTORNEY

Jan. 22, 1946.  A. Z. MAMPLE ET AL  2,393,329
FACSIMILE RECORDER
Filed Dec. 24, 1940  9 Sheets-Sheet 3

INVENTORS
A. Z. MAMPLE
L. A. REED
BY
ATTORNEY

FIG. 8

Jan. 22, 1946.  A. Z. MAMPLE ET AL  2,393,329
FACSIMILE RECORDER
Filed Dec. 24, 1940   9 Sheets-Sheet 7

INVENTORS
A. Z. MAMPLE
BY  L. A. REED
ATTORNEY

Jan. 22, 1946. A. Z. MAMPLE ET AL 2,393,329
FACSIMILE RECORDER
Filed Dec. 24, 1940 9 Sheets-Sheet 9

FIG. 15

INVENTORS
A. Z. MAMPLE
L. A. REED
BY
M. J. Reynolds
ATTORNEY

Patented Jan. 22, 1946

2,393,329

UNITED STATES PATENT OFFICE 2,393,329

FACSIMILE RECORDER

Adolph Z. Mample, Glen Rock, and Leland A. Reed, Chatham, N. J., assignors to The Western Union Telegraph Company, New York, N. Y., a corporation of New York Application December 24, 1940, Serial No. 371,534

26 Claims. (Cl. 178—11)

This invention relates to facsimile telegraph apparatus and more particularly to the type of machine disclosed in the application of Parrott et al., for Apparatus for facsimile telegraphy, filed August 28, 1937, Serial No. 161,358, now Patent No. 2,283,944, issued May 26, 1942.

An object of this invention is to provide an improved automatic facsimile machine of this type, constructed and arranged to provide improved operation over prolonged periods of time without requiring attention.

A further object is to provide a facsimile recorder of the type set forth having improved means for feeding and applying the recording strip to the supporting cylinder.

A still further object is to provide more intimate contact between the recording medium and the supporting cylinder.

A still further object is to provide an improved recording operation, together with improved means for severing and delivering messages from the recording strip.

These and other objects, which will be apparent to those skilled in the art, are accomplished by the present invention, one embodiment of which is illustrated in the accompanying drawings, in which.

In the illustrated embodiment of this invention a flat strip of recording paper is drawn off a supply roll and shaped into the form of a tube having overlapping edges. The shaping mechanism is constructed and arranged to insure the correct shaping of the tube by providing equal paths of travel for the edges of the strip with relation to the center thereof and to support substantially the entire inner and outer surfaces of the strip during the tube shaping operation to prevent kinking of the paper. The paper tube is supported throughout its travel through the entire machine by an inner mandrel or recording cylinder along which the tubular strip is fed by an improved feeding mechanism comprising reciprocating gripping devices cooperating with inner grippers slidable in slots formed in the recording cylinder. Above the feeding mechanism a recording apparatus of improved design is actuated by incoming signals to record the incoming message on the paper tube. After recording the message bearing section is severed and delivered automatically by severing and delivery mechanisms of improved design. From the time it is shaped into a tube until it reaches the recording position the record strip is gradually tightened around the recording cylinder. The recording chamber is enclosed and means are provided for removing therefrom the fumes produced by the recording operation. The electrical control and operation of the machine also embodies novel features which will be apparent hereinafter.

In the particular embodiment of the invention chosen for illustration, paper supply and tube forming mechanisms are mounted in the lower part of the machine frame 20, and include a supply roll 21 of recording paper, mounted in any desired type of friction bearings 22 on the frame. The flat paper sheet 23 is drawn from the supply roll over a guide roller 24 which is preferably tapered inwardly, see Fig. 11, to relieve the center area of the paper strip of strains at that point.

The flat strip is shaped into tubular form by shaping mechanism so arranged that the paths of travel of the edges of the strip are substantially equal to the path of travel of the center during the shaping operation, with the result that a paper tube is formed without subjecting the material to tearing strains. As illustrated, this is accomplished by guiding the strip in a U-shaped path around a guide roller 25 tapered outwardly from the center 25' thereof, see Fig. 11. After passing around the roller 25 the strip is prevented from collapsing or kinking inwardly by the inner shoe 26 and from buckling or kinking outwardly by the outer shoe 27, and it is thus gradually shaped into tubular form.

Preferably, each shoe is made of some malleable or pliable material such, for example, as lead so that the shape thereof can be easily adjusted to provide support for the surfaces of the strip as it is shaped to tubular form. An inner recording cylinder 28 extends vertically through the machine and provides a support throughout the entire length of the paper tube, which is shaped around it and fed longitudinally along it.

Figure 12:
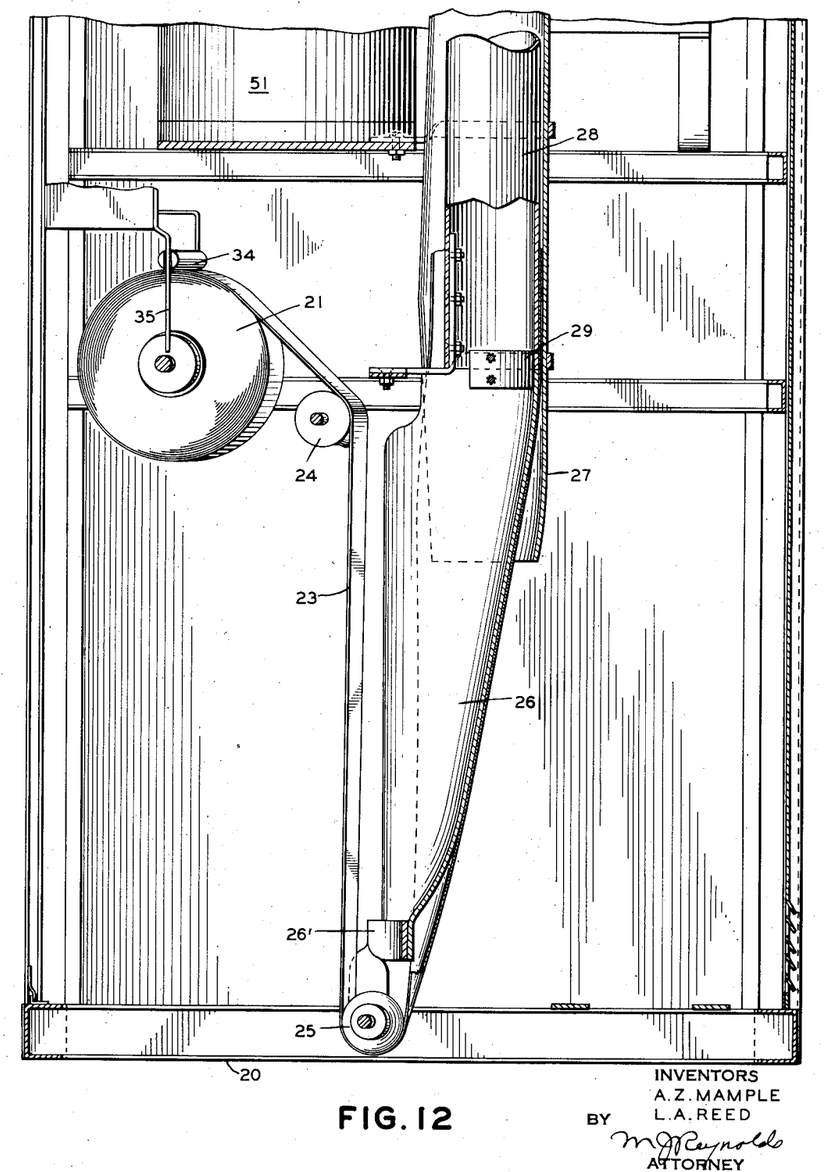
Fig. 12 is a section thereof taken on the line 12—12 of Fig. 11.

The inner shoe 26 is mounted at its lower end on a suitable bracket 26' extending across the lower frame members. The shoe 26 is shaped in a compound curve which is relatively flat at the base and of gradually decreasing radii towards the upper end. It extends from a point adjacent the tapered guide roller 25 at the bottom of the machine up to the lower end of the cylinder 28, see Fig. 12, at which point it approaches an arc of the radius of the cylinder 28. It is secured to the lower end of the cylinder 28 by a plug 29 extending thereinto. The joint between the ends of the shoe and cylinder is carefully made so as to present no paper obstructing edges, but rather a continuous smooth surface over which the paper will slide freely. At this point the record strip 23 is more or less U-shaped in cross section.

Figure 11:
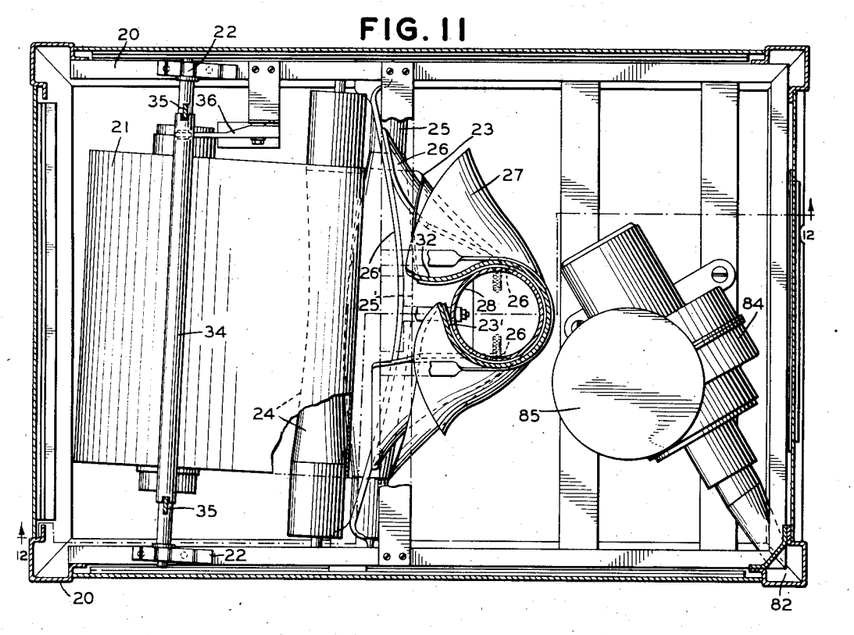
Fig. 11 is a transverse section on the line 11—11 of Fig. 2, showing in plan a part of the paper supply and shaping mechanism.
Figure 13:
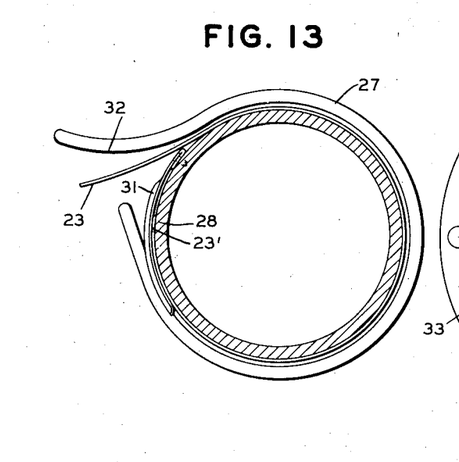
Figs. 13 and 14 are sections through the paper supporting mandrel taken on the lines 13—13 and 14—14, respectively, of Fig. 2.
Figure 14:
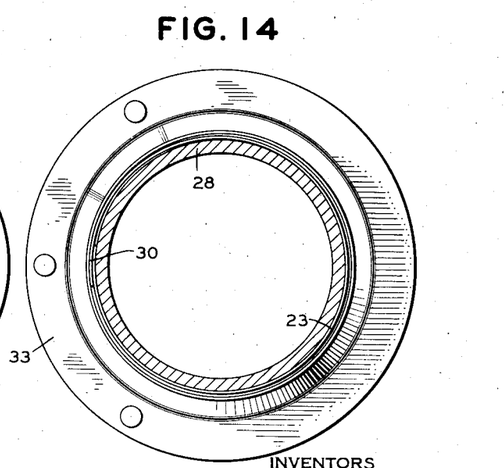

As shown in Figs. 11, 13 and 14, the outer shoe 27 partially surrounds the cylinder 28 in spaced relation thereto. As shown in Fig. 11, both shoes are shaped with a somewhat more acute curvature at one side than at the other so as to conform to the overlapping of the edges of the recording strip. As will be noted in Figs. 11 and 13, one edge 23' of the recording strip is brought into contact with the cylinder in advance of the other to form the overlapping edges 30 (Fig. 14). Proper overlapping of the edges is aided by mounting the upper supply roll, the idler 24 and guide roller 25 in parallel but with their axes at an angle of approximately 7° to the perpendicular to a diametral plane passing through the overlapping edges of the tube. As shown in Fig. 13, the inner edge is directed under a guide 31 and above this point the tongue 32 of the shoe 27 shapes the outer edge into overlapping position, thus closing the tube of recording paper which then passes upwardly through a collar 33, thus completing the shaping operation.

An alarm or signal is provided for showing when the supply of paper on the roll 21 is low. As illustrated, this includes a paper follower in the form of a rod 34 resting on the top of the supply roll between elongated, vertical guides 35 fitting loosely in notches in each end of the rod 34 so that the latter is free to slide downwardly between the guides as the supply roll diminishes in size. Near the lower limit of the rod's descent a switch arm 36 extends into the path of travel of the rod which engages the arm to operate the associated switch 37 and close the circuit of a signal lamp 38 or the like, see Fig. 15.

The mechanism (Figs. 7 and 8) for feeding the tube of recording paper intermittently upward around the recording cylinder 28 includes a feed carriage 40 formed by upper and lower cross frame members 41 and 42, respectively, connected by a vertical open frame member 43 adjacent and extending along the tube of recording paper. The carriage is periodically connected to a vertical feed screw 44 by a half nut mechanism constructed and operated in the manner set forth in the above mentioned application of Parrott et al. and including a half nut solenoid 45. The half nut solenoid 45 is mounted on an extension of the carriage member 42 and controls the engagement and disengagement of the half nut 44' with the feed screw 44. The half nut is mounted on an extension of the armature of the solenoid and is normally held in engagement with the feed screw by a spring 45'. It is disengaged by energization of the solenoid. The upper and lower frame members are slidable on vertical guide rods 46 and 47. The feed screw is driven at feeding speed for the recording operation by a slow speed motor 48 connected to the feed screw through a one way clutch 49 operated through a worm drive 50, see Figs. 1 and 2. The feed screw is driven at high speed after each recording operation to advance the heading of the blank and the unrecorded portion thereof, by a high speed motor 51 connected to the screw by gearing 52. The operation of the motors and the movement of the feed carriage is as described in said application. The half nut mechanism is moved into engagement with the feed screw to move the carriage upwardly and is disengaged to permit the carriage to return by gravity to its starting position. The return of the carriage is retarded and timed by an oil dash check 53 connected to the carriage by levers 54 or the like, see Fig. 2. An emergency switch 55 having an arm 56 in the path of movement of a lug 57 on the lower cross frame 42 is provided for stopping the high speed motor if the half nut solenoid fails to act to disengage the half nut from the feed screw at the end of the feeding operation.

Figure 9:
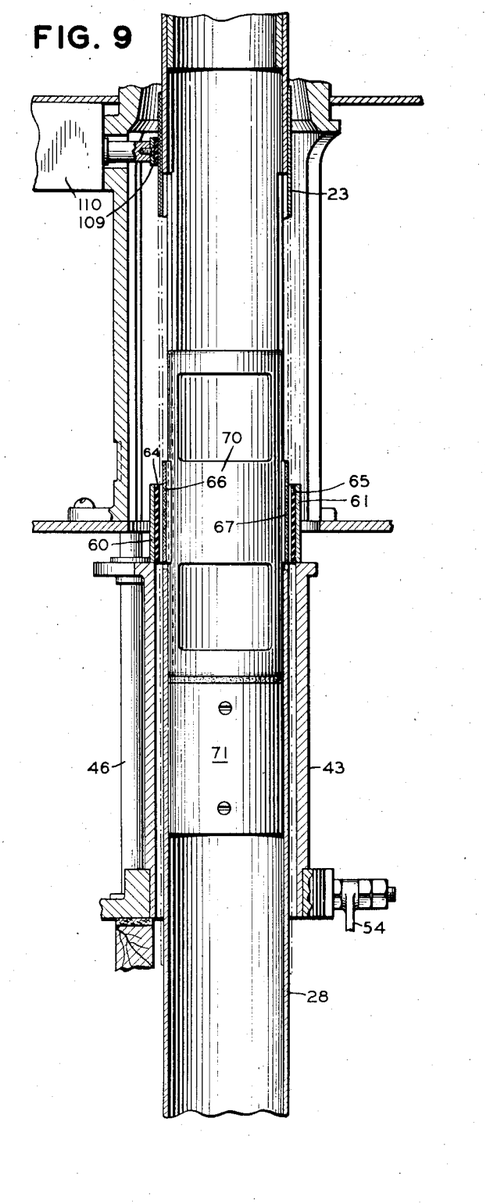
Fig. 9 is a section on the line 9—9 of Fig. 7.
Figure 10:
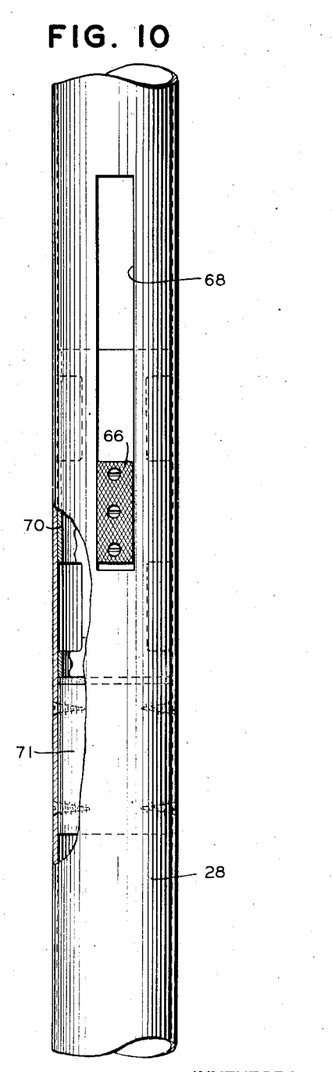
Fig. 10 is a side elevation partly in section of the mechanism shown in Fig. 9.

A mechanism for gripping the paper tube during upward feeding movement of the carriage is supported on the upper cross frame member. As illustrated, a pair of gripping levers 60 and 61 are fulcrumed on pivots 63 on the frame member 41 at one side of the cylinder 28 and extend therearound. The lever 60 has a paper tube engaging pad 64 positioned so as to contact the tube across its overlapped edges, while the lever 61 has a similar pad 65 positioned so as to contact the tube diametrically opposite to the first pad. The tube engaging pads are mounted on the respective levers equidistant from the associated pivot so that movement of the two pads is identical when the levers are similarly actuated. Inner tube-engaging pads 66 and 67 slidably mounted in slots 68 and 69 in the recording cylinder 28 cooperate with the outer gripping pads 64 and 65, respectively, and provide surfaces against which the outer pads press the paper tube. The inner pads are mounted on an inner slide tube 70 slidable within the cylinder 28. It will be apparent that the tube of recording paper is supported against collapse inwardly under the grip of the outer pads by the continuous surface of the recording cylinder and the inner slidable gripping pads. The pads 64 to 67 positively grip the paper cylinder and prevent it from turning on the cylinder by the rotative action of the stylus. An insert 71 is secured in the cylinder in position to form a supporting stop for the inner slidable tube 70 in its lower position, see Figs. 9 and 10.

Figure 7:
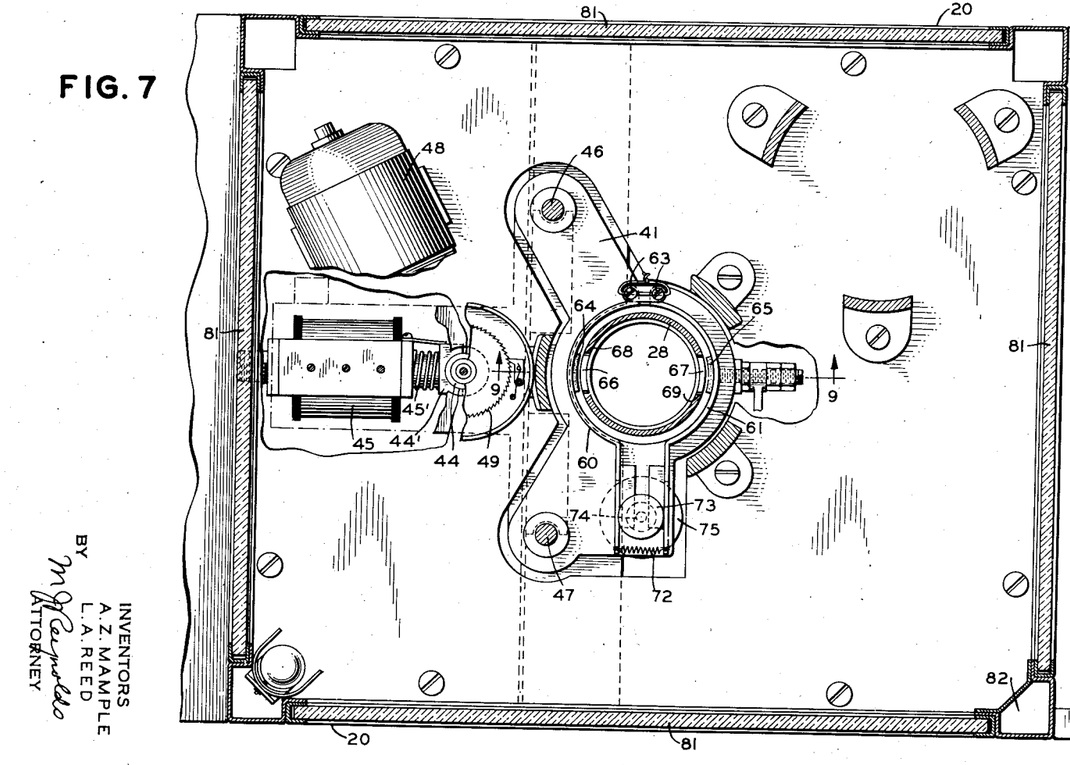
Fig. 7 is a transverse section on the line 7—7 of Fig. 2, showing an enlarged detail of the paper feeding carriage.
Figure 8:
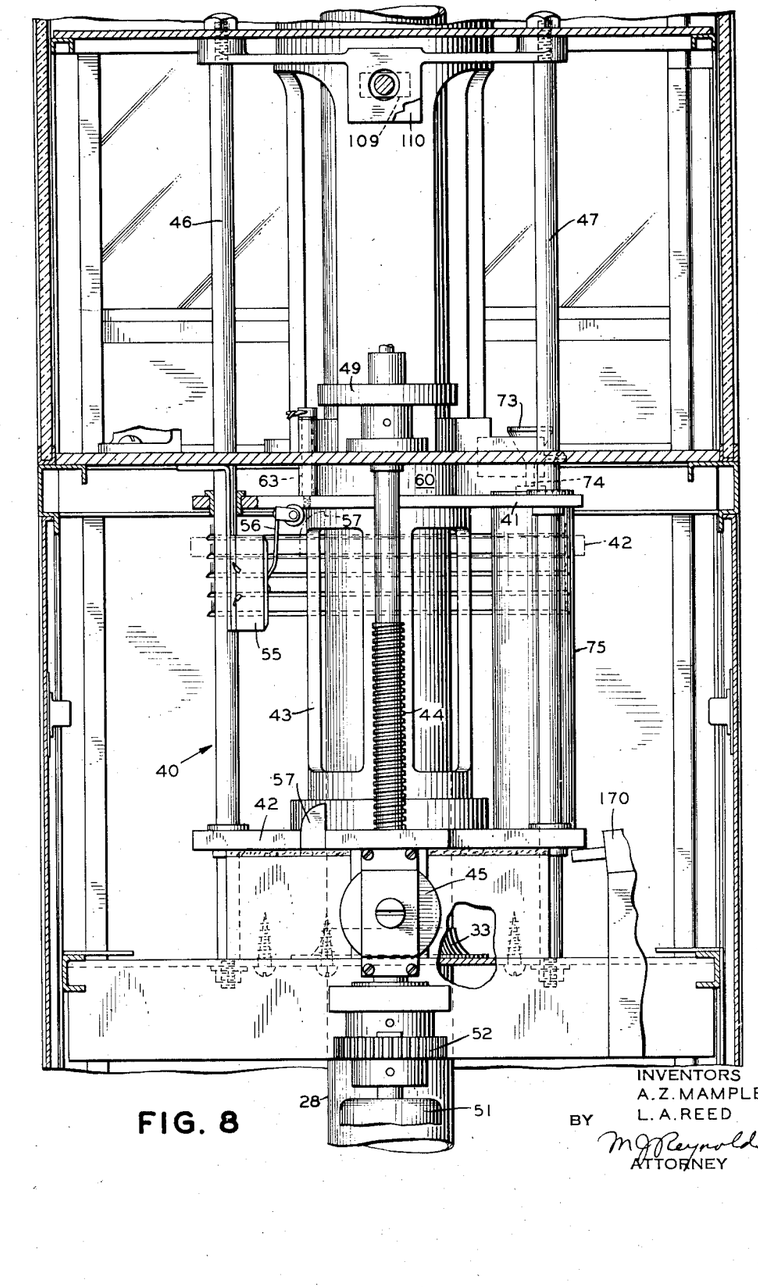
Fig. 8 is a side elevation, partly in section, on the line 8—8 of Fig. 2.

The free ends of the outer pad supporting levers 60 and 61 are drawn together by a spring 72 into engagement with the opposite sides of a lever operating vertically movable wedge 73 connected to the projecting end of the core 74 of a solenoid 75, see Figs. 7 and 8, similar in construction and operation to the corresponding mechanism described in said application. By locating the outer gripping pads 180° apart with one pad in position to engage the overlap, and locating the fulcrum points and the operating wedge so that both pads are moved an equal amount relative to the paper recording tube and at the same time, and by providing inner gripping pads working in slots all twisting effect upon the paper tube is overcome and the feeding operation occurs without damage or distortion to the tube.

The recording compartment 80 is located adjacent the top of the machine and is preferably enclosed within side panels 81 of glass or other material so that fumes which may be produced by the recording operation can be withdrawn by a suitable mechanism such as the illustrated exhaust conduit 82 formed in one of the corner frame members of the machine and leading to an exhaust pump 84 in the bottom of the machine which delivers them to any desired point, for example, passing them into a filter 85. There is sufficient space along the tops of the panels to permit ingress of air to the compartment to prevent a vacuum therein.

Figure 5:
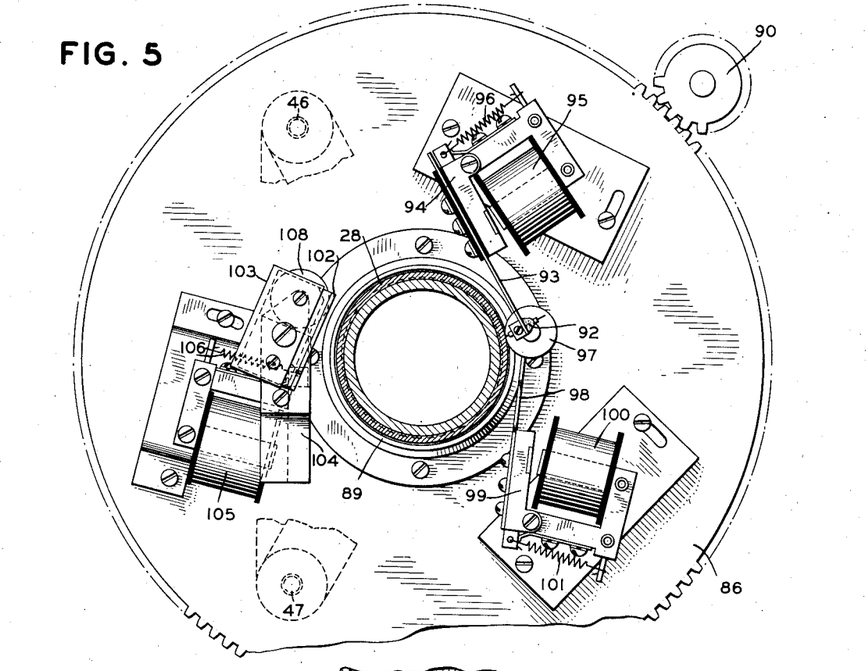
Fig. 5 is a transverse section on the line 5—5 of Fig. 2, showing an enlarged detail of the cutter and the stylus mechanisms.
Figure 6:
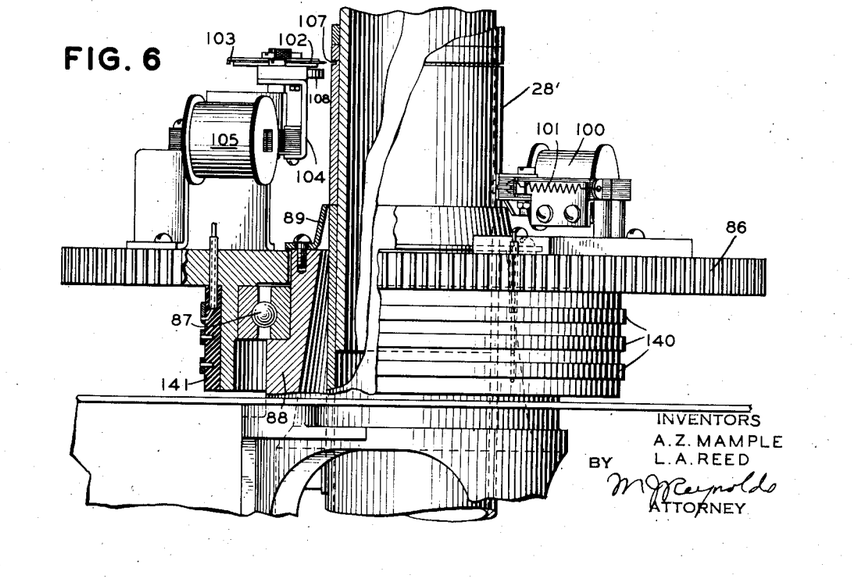
Fig. 6 is an elevation, partly in section, of the mechanism shown in Fig. 5.

The recording and severing mechanism (Figs. 5 and 6) is mounted on a supporting gear wheel 86 supported on ball bearings 87 mounted on an annular frame member 88 through which the cylinder 28 passes. A collar 89 is mounted on the frame member and surrounds the cylinder with less clearance than the collar 33 so that the paper tube is gradually contracted around the cylinder as it is fed upwardly until in the recording and cutting compartment it is held firmly in contact with the cylinder. This improves and renders more accurate and dependable the recording and severing operations. The gear wheel is driven through gearing 90 (Fig. 2) by a motor 91 operating at a substantially constant speed either under the control of a sensitive governing device, or by a synchronous motor operated by a frequency regulated alternating current.

A recording stylus 92 is mounted on an extension arm 93 of a pivoted armature 94 controlled by a stylus magnet 95. A spring 96 holds the stylus in recording position adjacent the paper tube when the magnet is deenergized. When energized the magnet draws the stylus into nonrecording position.

Means is provided for pressing the paper tube against the cylinder directly under the stylus in order to improve the electrical recording action between the stylus and the grounded cylinder. This is illustrated as a wheel 97 mounted on an extension 98 of the armature 99 of a presser wheel magnet 100. A spring 101 holds the wheel in engagement with the paper tube and presses it firmly against the cylinder under the stylus when the presser wheel magnet is deenergized. When energized the wheel magnet draws the wheel away from the paper. The wheel 97 is located closely adjacent the stylus and slightly leads the same, thus insuring that the paper will be stationary and in firm contact with the cylinder at the point of recording, independently of the stylus pressure. The stylus pressure may thus be reduced to a low value, dependent only on its function of passing the marking current to the blank. An insert 28' of stainless steel is provided for the cylinder 28 at the recording zone in order to minimize corrosion due to the recording action and to provide a hard wear resisting surface beneath the stylus and the pressure roller.

The roller 97 is grounded to the machine so as to form a part of the return circuit for the marking current, the current dividing with part passing through the conducting paper into the cylinder and part passing laterally through the paper and to the roller. Due to the parallel current paths, the current density at the point of contact of the roller with the paper is insufficient to produce any marking action at that point. It will be understood, of course, that if a roll of sufficient contact area is provided to reduce the current density at the point of contact therewith below that required for marking, the entire return path for the marking current might be made through the roller, in which case the cylinder insert 28' could be of non-conducting material. With such a construction it is not necessary that the recording blank have conductivity throughout its thickness but only that there be a layer of conducting material beneath the marking coating so as to provide the lateral path to the pressure roller. Supplemental means such as contacting shoes or additional rollers might be provided to increase the extent of the return path of the marking current as will be obvious.

A cutter for severing message bearing sections from the upper end of the paper tube is provided and is shown as a blade 102 or the like secured to a holder 103 on a pivoted armature 104 of a cutter magnet 105. A spring 106 draws the cutter into inoperative position when the cutter magnet is deenergized. When energized the magnet draws the cutter into engagement with the paper tube severing a message bearing section therefrom after a recording operation. In the severing operation the edge of the blade enters a slot 107 in the cylinder surface. In order to prevent lash of the parts causing the blade edge to strike the bottom of the slot, becoming dull and incapable of proper action a wheel 108 or the like is mounted on the blade carrier in position to engage the paper tube and cylinder and definitely limit the extent to which the blade enters the slot. A holding pad 109 (Figs. 8 and 9) on the end of the core of a holding solenoid 110 is employed to hold the paper tube against the cylinder during the cutting operation in a manner similar to said application.

Figure 4:
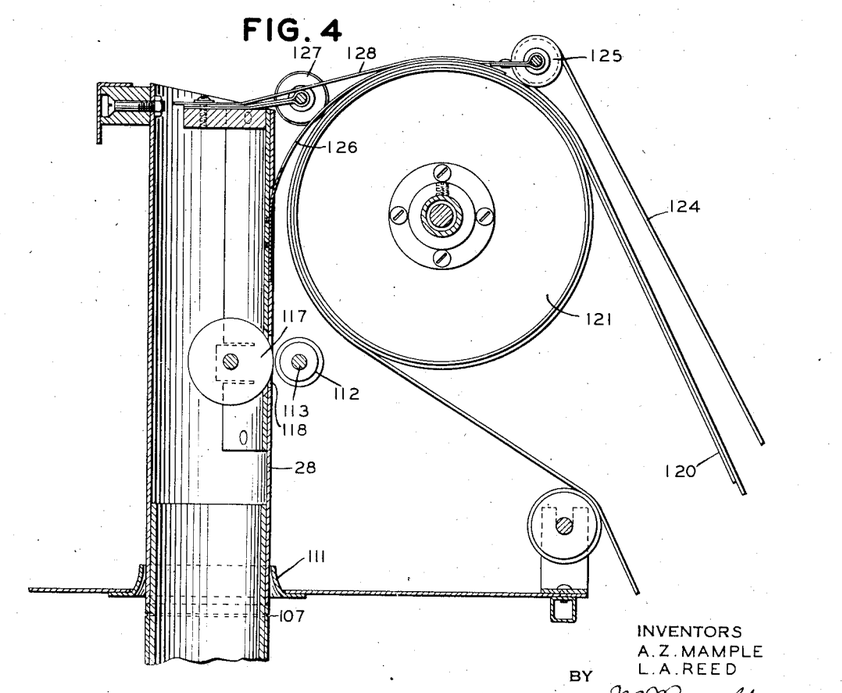
Fig. 4 is a vertical section on the line 4—4 of Fig. 3, showing the improved message ejector and conveyor mechanism.

Just above the cutting slot 107 a collar 111 (Fig. 4) surrounds the cylinder and presses the tube into close contact therewith at that point. Above the collar a continuously rotating pick-up or ejector wheel 112 is mounted on a movable shaft 113, one end of which is connected to the movable armature 114 of a magnet 115. A spring 116 biases the shaft so as to hold the wheel in inoperative position when the magnet is deenergized. When energized the magnet shifts the wheel into contact with a severed message bearing section between the wheel and an idler 117 mounted within the cylinder 28 and projecting through a slot 118. When engaged by the ejector wheel 112 a severed section is carried upward until the upper edge of the severed section is engaged by the spaced idler wheel 117. The distance between idler wheel 127 and ejector wheel 112 is spaced so that it is slightly less than the length of the severed section, thus delivering the severed section as it is released by ejector wheel without tearing or injuring the severed section. The severed message is then delivered to a conveying mechanism which is illustrated as comprising an endless conveyor belt 120 passing over a driven pulley 121 and a driving pulley 122 continuously driven by a conveyor motor 123. A cooperating conveyor belt 124 for holding the severed sections on the main belt is in contact therewith and passes over idlers 125. A flexible steel bank 126 is secured to the cylinder above the ejector wheel for directing the severed sections onto the conveyor belt 120, under an idler 127, beneath the flexible strip 128 and into the bite of the conveyor belts 120 and 124. The ejector wheel is continuously driven by a belt 130 connecting a pulley 131 on the ejector wheel shaft 113 to a pulley 132 on the shaft 133 supporting the conveyor pulley 121. A box 135 or other device may be provided for receiving the message bearing sections from the conveyor belt 120.

Figure 1:
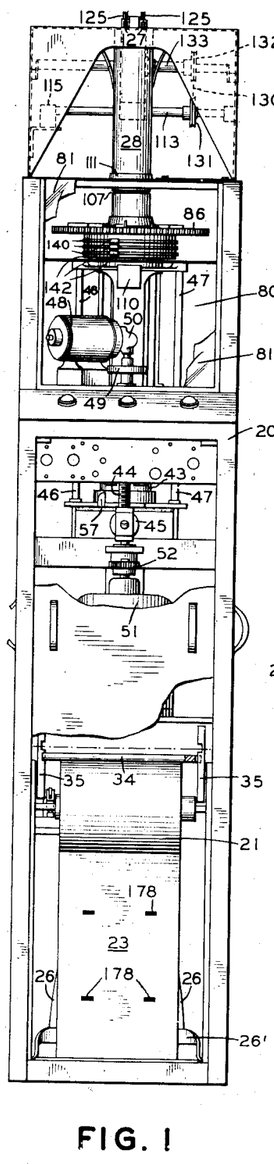
Fig. 1 is a front elevation of an automatic facsimile machine constructed in accordance with one embodiment of this invention.
Figure 2:
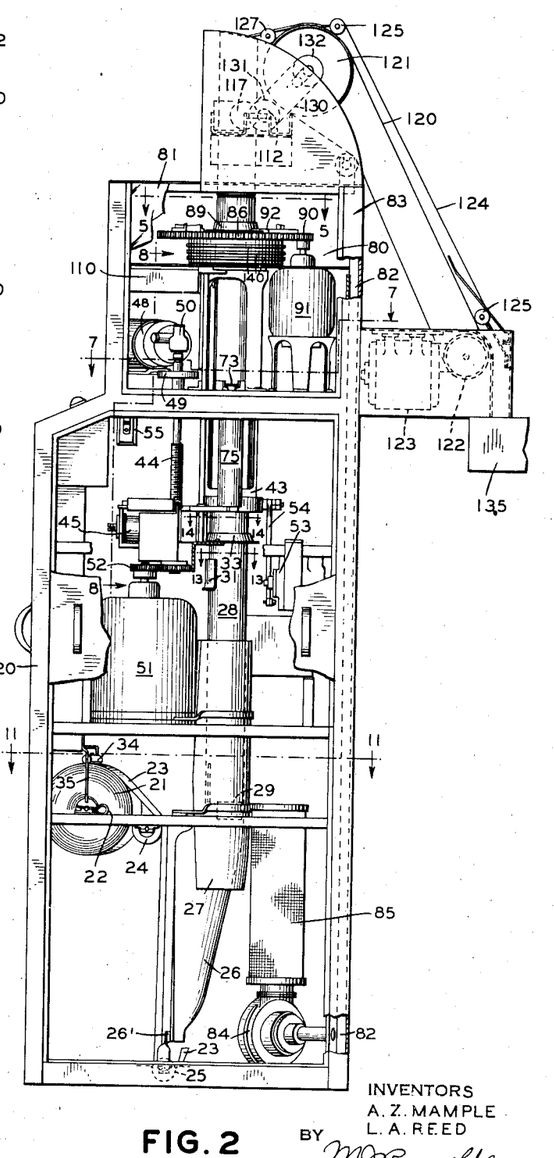
Fig. 2 is a side elevation of the machine shown in Fig. 1, taken from the right thereof.
Figure 3:
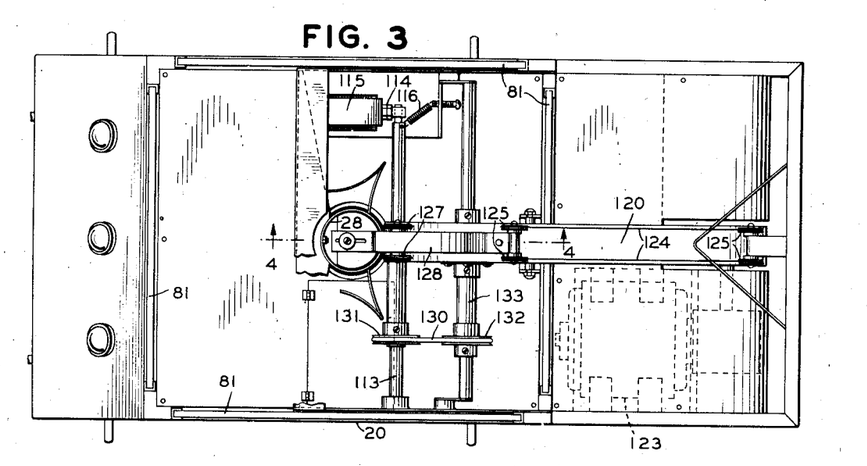
Fig. 3 is a top plan view thereof.

As indicated in Figs. 1 and 2, the machine frame below the recording chamber is enclosed by detachable panels 134 having handles 135.

Operating current is supplied to the stylus and to the magnets controlling the stylus, cutter and presser wheel by collector rings 140 fitted over a band of insulating material 141 on the hub of the gear wheel 86. Brushes 142 engage the collector rings. This construction is generally similar to that described in the said application.

The operation of the machine will be described with reference to the wiring diagram in Fig. 15. Assume that the strip of recording paper has been properly threaded through the shaping shoes, paper gripping and feeding mechanisms, recording and cutting devices, and that the machine is connected to the circuit for recording. A relay TT, not shown, is connected by conductor 150 to the low speed motor control relay 151 and relay 152 controlling the stylus and presser wheel magnets 95 and 100, respectively. At the beginning of the operation of the transmitter a signal is transmitted which operates the TT relay, thus energizing the relay 151 and closing the circuit to the low speed feeding motor 48 through the back points of the relay 151.

Relay 152 is also operated at the same time, interrupting the circuit from the D. C. source over conductor 153 to the stylus magnet 95 and presser wheel magnet 100. This permits the associated springs to draw the presser wheel and stylus into engagement with the tube of recording paper in preparation for the recording operation. Relay 152 at its front contacts closes the circuit of the blower or exhaust motor 84 through the A. C. conductor 156.

Incoming signals received over the line 157 pass through receiving amplifier 158, testing jacks 159 and transformer 160 to the stylus 92.

The low speed motor 48 drives the feed screw 44 at scanning speed and the stylus motor 31 rotates the gear wheel 86 to revolve the stylus around the tube of recording paper. The rotation of the stylus and speed of the feeding screw are such as to provide scanning at any predetermined number of lines per inch. Phasing of the stylus motor may be accomplished manually by operating switch 161 or automatically, if desired.

The various motors are, in the illustrated embodiment, all driven from a suitable source of A. C. through conductors 162.

Figure 15:
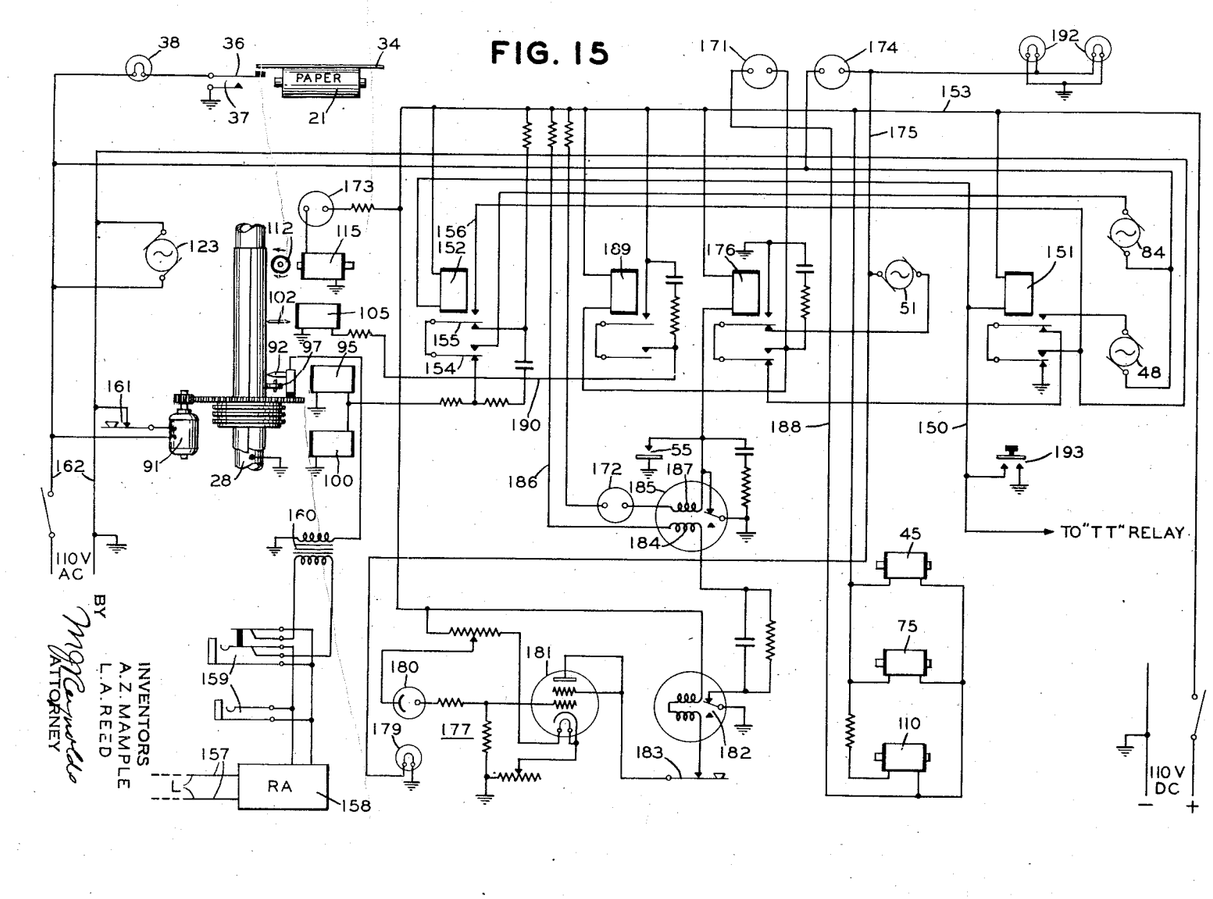
Fig. 15 is a wiring diagram showing a preferred circuit arrangement for use in operating the machine.

A panel 170 of four mercury switches 171, 172, 173 and 174, respectively, see Figs. 8 and 15, is pivoted on the machine frame in position to be rocked by the carriage in its lower position.

At the beginning of the above described operation, when the carriage was in the lower position, the mercury switch 174 was held open. Through conductor 175 mercury switch 174 controls the high speed motor 51. Hence, with the carriage at the bottom of its travel the high speed motor circuit is open. Operation of relay 151 at the beginning of the operation, in addition to closing the circuit to the low speed motor 48 also opens the circuit to the high speed motor 51, this circuit normally extending from the ground through back contacts and armatures of relay 151, back contacts and armature of relay 176, motor 51 and mercury switch 174 to the A. C. source. Consequently, while the upward movement of the feed carriage closes the mercury switch 174, the high speed motor 51 does not operate until completion of the recording operation, at which time the TT relay is released by a received end-of-message signal resulting in the release of the relay 151, whereupon the circuit to the low speed motor 48 is interrupted and the high speed motor circuit closed. Closing of this latter circuit causes motor 51 to rapidly feed the paper tube upwardly to bring the paper into proper position for cutting. Simultaneously, with the release of relay 151, the relay 152 is also released to effect energizing of the stylus and presser wheel magnets to withdraw the stylus and presser wheel from engagement with the paper, while also stopping the blower or exhaust motor 84.

Upward feed of the paper by the high speed motor is terminated by a photocell mechanism 177 actuated by black spots 178, Fig. 1, spaced along the recording strip at intervals equal to the width of message blanks. The passage of a black spot into the focussed ray of a photocell light 179 modifies the output of a photocell 180. The energizing circuit for the lamp 179 is normally open at the mercury switch 174 but is energized upon each upward movement of the carriage, due to the operation of switch 174, to thus condition the photocell to respond to the intervention of the black spots in the light to photocell path. The cell output is amplified by an amplifier 181 of conventional design and controls a photocell relay 182, connected to the amplifier through a test jack 183. The operation of relay 182 in response to the scanning of a black spot on the blank closes a circuit including a coil 184 of a relay 185 connected to the D. C. source by conductor 186. Relay 185 is arranged to lock itself through locking coil 187 and mercury switch 172, the latter of which is closed upon movement of the carriage from its lower position. Relay 185 in turn operates relay 176 which first breaks the high speed motor circuit at its back contact and then through its front contacts closes a circuit through mercury switch 171 and conductor 188 to the half nut solenoid 45, the paper clutch solenoid 75 and the paper holding solenoid 110. Operation of the solenoid 45 releases the carriage from the feed screw, solenoid 75 lowers the wedging cone 73 to release the paper tube from the paper gripping pads 60 and 61, and operation of solenoid 110 moves the brake or pad 109 into position to hold the paper tube against the cylinder for cutting.

The release of the gripping pads 60 and 61 and energizing of solenoid 45 permits the paper feed carriage to return to its lower position by gravity, the time of return being controlled by the dash pot 53.

Operation of relay 176, by relay 185, also completes the operating circuit of relay 189, which closes the circuit to the cutter magnet 105 through conductor 190 and the relay contacts. Energizing the cutter magnet draws the cutting edge through the paper tube into the cutter receiving slot 107 in the cylinder so that the message bearing end of the tube is severed.

The dash pot check retards the return movement of the carriage long enough to permit the cutting action to be completed, before further upward feed of the paper begins. As the carriage approaches the starting or lower position it operates the mercury switch panel 170 to open switches 171, 172 and 174 and close switch 173. Opening mercury switch 171 restores the paper clutch magnet 75, the half nut magnet 45, the holding solenoid 110 and the relay 189 to their normal or starting condition. Opening mercury switch 172 unlocks the locking coil 187 of relay 185 and releases relay 176. The arrangement is such that mercury switch 171 opens just ahead of mercury switch 172. This prevents an inductive arc forming off relay 176. The release of relay 176 in turn releases relay 189 and restores the cutter to its inoperative position. The relay 176 on returning to its released position prepares a circuit through its back contacts to the high speed motor 51, but mercury switch 174 being open at this time, no current flows through this circuit. The conveyor motor 123 is driven continuously. Closing of mercury switch 173 by the carriage in its lower position energizes the ejector wheel magnet 115 and moves the rotating wheel 112 into engagement with the severed message blank which is immediately projected into the bite of the idler 127 and conveyor belt 120 under flexible band 126, whereupon the conveyor belt delivers it to the collector box 135 or any other desired device. When the carriage again moves upward, the mercury switch 173 opens permitting the spring 116 to move the ejector roll to its inoperative position.

If desired, display lamps 192 are located in the recording cabinet to illuminate the recording operation. As illustrated, the lamp circuit is controlled by mercury switch 174.

A test switch 193 is connected between the conductor 150 and ground for testing purposes.

The emergency control switch 55 is connected and arranged to provide a ground for the winding of relay 176 so as to effect the operation of the relay and to break the high speed motor circuit in case the relay 185, actuated by the photocell, fails to function.

It will be understood that many modifications and changes can be made in the structure and circuit arrangements shown without departing from the essential attributes of the invention, and we contemplate all such changes as coming within the scope of the appended claims.

What we claim is:

1. In a facsimile recording machine in which a substantially flat strip of recording paper is fed to the machine and shaped temporarily into tubular form for scanning and recording thereon the signals representative of messages received by the machine, means for shaping said recording paper into said tubular form without kinking or subjecting the material to tearing strains, comprising tube-forming structure and feeding and guide means for said strip operative to substantially equalize the lengths of the paths of travel of the edges of the recording strip with the center thereof during said shaping operation, said feeding and guide means comprising a concave surface over which the strip is passed to relieve tension in the center thereof and a convex surface over which the strip is passed to relieve tension in the edges thereof, said concave and convex guide surfaces being spaced from each other so that they are engaged successively by the strip in its travel towards said tube-forming structure.

2. In a facsimile recording machine in which a substantially flat strip of recording paper is fed to the machine and shaped temporarily into tubular form for scanning and recording thereon the signals representative of messages received by the machine, means for shaping said recording paper into said tubular form without kinking or subjecting the material to tearing strains, comprising tube-forming structure and feeding and guide means forming a U-shaped path of travel for said strip to the tube-forming structure, said guide means including a concave roller for said strip and a convex roller for the strip located at the bottom of said U-shaped path.

3. In a facsimile recording machine in which a substantially flat strip of recording paper is fed to the machine and shaped temporarily into tubular form for scanning and recording thereon the signals representative of messages received by the machine, means for shaping said recording paper into said tubular form without kinking or subjecting the material to tearing strains, comprising tube-forming guide shoes disposed adjacent to the opposite surfaces of said strip and operative during shaping thereof to support said strip against kinking, and a plurality of guide means around which the strip passes successively, one of said guide means having ends of relatively greater diameter and a center of relatively less diameter, and another of said guide means having a center of relatively greater diameter and ends of relatively less diameter, the guide means coacting to substantially equalize the lengths of the paths of travel of the edges of said strip with the center thereof during said shaping operation.

4. In a facsimile recording machine in which a substantially flat strip of recording paper is fed to the machine and shaped temporarily into tubular form for scanning and recording thereon the signals representative of messages received by the machine, means for shaping said recording paper into said tubular form without kinking or subjecting the material to tearing strains, comprising means operated by longitudinal movement of said strip for shaping said strip into tubular form including tube-forming structure and a guide roller around which said sheet passes having ends of relatively greater diameter and a center of relatively less diameter and a guide roller around which said sheet passes tapered outwardly from a center of relatively greater diameter to ends of relatively less diameter so as to substantially equalize the lengths of the paths of travel of the edges of said sheet with the center thereof during said shaping operation, said guide rollers being spaced from each other so that they successively engage the strip in its travel towards said tube-forming structure.

5. In a facsimile recording machine in which a substantially flat strip of recording paper is fed to the machine and shaped temporarily into tubular form for scanning and recording thereon the signals representative of messages received by the machine, means for shaping said recording paper into said tubular form without kinking or subjecting the material to tearing strains, comprising tube-forming members and an inwardly tapered guide roller over which said strip passes, said means including an outwardly tapered guide roller around which said strip subsequently passes.

6. In a facsimile recording machine in which a substantially flat strip of recording paper is fed to the machine and shaped temporarily into tubular form for scanning and recording thereon the signals representative of messages received by the machine, means for shaping said recording paper into said tubular form without kinking or subjecting the material to tearing strains, comprising concave and convex guide rollers over which said strip passes in the order named, and means for supporting said supply roll and guide rollers in parallel and at an acute angle to a diametral plane passing through the overlap of the formed tube.

7. In a facsimile recording machine in which a substantially flat strip of recording paper is fed to the machine and shaped temporarily into tubular form for scanning and recording thereon the signals representative of messages received by the machine, means for shaping said recording paper into said tubular form without kinking or subjecting the material to tearing strains, comprising concave and convex guide rollers over which said strip passes in the order named, means for supporting said supply roll and guide rollers in parallel and at an acute angle to a diametral plane passing through the overlap of the formed tube, and a friction bearing for said supply roll.

8. The combination in a facsimile machine of a recording cylinder, means for shaping a strip of paper into closed tubular form around said cylinder, a stylus adapted to be actuated by incoming signals to record them on said tube, and means associated with said stylus for pressing the portion of said tube adjacent to said stylus against said cylinder.

9. The combination in a facsimile machine of a recording cylinder, means for shaping a strip of paper into closed tubular form around said cylinder, a stylus adapted to be actuated by incoming signals to record them on said tube, means for revolving said stylus around said tube, a wheel associated with said stylus, and means for moving said wheel into engagement with said tube to press the portion of said tube adjacent to said stylus against said cylinder.

10. The combination in a facsimile machine of a recording cylinder, mechanism for shaping a strip of recording paper around said cylinder to form a continuous tube, means for feeding said tube longitudinally of said cylinder, collars spaced along said cylinder for progressively wrapping said tube closer around said cylinder, a stylus for recording on said tube, means for revolving said stylus around said tube during recording, a wheel movable with said stylus and engaging said tube adjacent said stylus to hold it against said cylinder, a cutter for severing sections of said tube, and a conveyor for delivering said severed sections from said machine.

11. The combination in a facsimile machine of a recording cylinder, mechanism for shaping a strip of recording paper around said cylinder to form a continuous tube, means for feeding said tube longitudinally of said cylinder, collars spaced along said cylinder for progressively wrapping said tube closer around said cylinder, a stylus for recording on said tube, means for revolving said stylus around said tube during recording, a wheel movable with said stylus and engaging said tube adjacent said stylus to hold it against said cylinder, a cutter for severing sections of said tube, a conveyor for delivering said severed sections from said machine, means including a rotating wheel for feeding said severed sections to said conveyor, and means for causing said wheel to engage said sections after operation of said cutter.

12. The combination in a facsimile machine having a supporting cylinder for a strip of recording paper disposed in tubular form and mechanism for feeding a tube longitudinally thereof, of means responsive to received facsimile signals for recording successive messages on the strip while in said tubular form, means for cutting a message bearing section from the end of said tube comprising a cutter, means for revolving said cutter around said tube, means for moving said cutter into engagement with said tube, a slot in said cylinder into which the edge of said cutter extends during a cutting operation, and means movable with said cutter and adapted to engage said tube and cylinder to limit the movement of said cutter into said slot to protect the cutter edge.

13. The combination in a facsimile machine having a supporting cylinder for a strip of recording paper disposed in tubular form and mechanism for feeding a tube longitudinally thereof, of means responsive to received facsimile signals for recording successive messages on the strip while in said tubular form, means for cutting a message bearing section from the end of said tube comprising a cutter, means for revolving said cutter around said tube, means for moving said cutter into engagement with said tube, a slot in said cylinder into which the edge of said cutter extends during a cutting operation, a wheel connected to said cutter and arranged to engage said tube and cylinder to limit the movement of said cutter into said slot to protect the cutter edge.

14. The combination in a facsimile machine of mechanism for feeding a continuous strip of recording paper therethrough, means for recording successive messages thereon, means for severing successive message bearing sections therefrom, means for ejecting said severed sections including a rotating delivery wheel engageable with the sections, and means for moving said wheel into engagement with said sections in succession for ejecting the same.

15. The combination in a facsimile machine of mechanism for feeding a continuous strip of recording paper therethrough, means for recording successive messages thereon, means for severing successive message bearing sections therefrom, means for ejecting said severed sections including a rotating delivery wheel, a cooperating idler, means for moving said delivery wheel to engage said sections between said idler and wheel, and a conveyor mechanism to which said sections are delivered by said wheel.

16. The combination in a facsimile machine of mechanism for feeding a continuous strip of recording paper therethrough, means for recording successive messages thereon, means for severing successive message bearing sections therefrom, means for ejecting said severed sections including a rotating delivery wheel, a cooperating idler, means controlled by the operation of said feeding means for moving said delivery wheel to engage said sections between said idler and wheel, and a conveyor mechanism to which said sections are delivered by said wheel.

17. The combination in a facsimile machine of a recording chamber, a recording mechanism therein, means for feeding a recording sheet past said mechanism, said recording mechanism comprising an electrical stylus for scanning said sheet and applying marking current to selected elemental areas thereof, means forming an enclosure for said chamber, and means for removing fumes caused by the recording operation from said chamber including an exhaust outlet for said fumes and a pump for drawing off said fumes from said chamber through said outlet.

18. The combination in a facsimile machine of a recording chamber, a recording mechanism therein, means for feeding a recording sheet past said mechanism, said recording mechanism comprising an electrical stylus for scanning said sheet and applying marking current to selected elemental areas thereof, means forming an enclosure for said chamber constructed and arranged to permit ingress of air thereto, and means for removing fumes caused by the recording operation from said chamber including an exhaust outlet for said fumes and a pump for drawing off said fumes from said chamber through said outlet, and a filter through which said fumes are passed.

19. The combination in a facsimile machine of mechanism for feeding a continuous strip of recording paper therethrough, including a reciprocating carriage, means responsive to incoming facsimile signals for recording successive messages on said strip, means for severing successive message bearing sections therefrom, means for positively ejecting said severed sections, and mechanism for electrically controlling and operating said means in timed coordination including a carriage actuated group of mercury switches.

20. A facsimile recording machine having mechanism for feeding a continuous strip of recording paper therethrough, means responsive to incoming facsimile signals for recording successive messages on said strip of paper, said paper bearing spaced indicia for controlling the spacing of successive messages recorded thereon, a motor for operating said paper feeding mechanism, and means including a photocell responsive to said indicia for stopping said motor when one of said indicia reaches a predetermined point.

21. A facsimile recording machine having mechanism for feeding a continuous strip of recording paper therethrough, means for recording messages thereon, means for severing successive message bearing sections therefrom including a rotating wheel, means for moving said wheel into engagement with successive message bearing sections to feed said sections out of the machine and a solenoid controlled mechanism for moving said wheel into and out of operative position.

22. In a facsimile machine having a support for a strip of recording paper in tubular form and mechanism for feeding a tube longitudinally thereof, means responsive to incoming facsimile signals for recording successive messages on said strip, means for cutting a message bearing section from the end of said tube comprising a cutter, means for revolving said cutter around said tube, means for moving said cutter into engagement with said tube, a slot in said support for accommodating the edge of said cutter during a cutting operation, and means for limiting the movement of said cutter into said slot to protect the cutting edge.

23. In a facsimile machine having means for recording successive messages on a strip of recording paper, an ejecting roller, means for feeding the end of said strip into operative association with said roller, means responsive to incoming facsimile signals for recording successive messages on said strip, means for severing successive message bearing sections from said strip, and means for operating said roller to eject said severed sections.

24. In a facsimile machine having means for recording successive messages on a strip of recording paper, an ejecting roller, means for feeding the end of said strip into operative association with said roller, means responsive to incoming facsimile signals for recording successive messages on said strip, means for severing successive message bearing sections from said strip, means for operating said roller to eject said severed sections, and a conveyor mechanism for receiving said sections from said roller.

25. The combination in a facsimile machine of means including a recording cylinder adapted to form and support a tube of recording paper, a stylus adapted to be actuated by incoming signals to record them on said paper, and means associated with said stylus and forming a part of the stylus circuit for pressing said paper against said cylinder adjacent to said stylus.

26. The combination in a facsimile machine of a recording cylinder, means for forming and feeding a tube of recording paper longitudinally along said cylinder, and a stylus adapted to be actuated by incoming signals to record them on said paper, said cylinder having a hard corrosion resistant surface adjacent said stylus.

ADOLPH Z. MAMPLE.
LELAND A. REED.